United States Patent
Winstead

(10) Patent No.: US 7,104,243 B2
(45) Date of Patent: Sep. 12, 2006

(54) REDUCING ACOUSTIC NOISE OF AN ENGINE HAVING ELECTROMECHANICAL VALVES

(75) Inventor: Vince Winstead, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/059,708

(22) Filed: Feb. 17, 2005

(65) Prior Publication Data

US 2006/0180119 A1    Aug. 17, 2006

(51) Int. Cl.
  *F02D 13/02* (2006.01)
  *F02B 29/08* (2006.01)
(52) U.S. Cl. .................. 123/198 F; 123/90.11
(58) Field of Classification Search .......... 123/198 F, 123/90.11, 90.18, 192.1, 192.2, 332, 335, 123/481
  See application file for complete search history.

(56) References Cited

U.S. PATENT DOCUMENTS

| | | | |
|---|---|---|---|
| 5,027,753 A | 7/1991 | Hamazaki et al. | |
| 6,405,693 B1 | 6/2002 | Yoeda et al. | |
| 6,684,842 B1 | 2/2004 | Hellie et al. | |
| 6,698,390 B1 | 3/2004 | Kostum et al. | |
| 6,705,428 B1 | 3/2004 | Kudernatsch | |
| 2003/0131820 A1* | 7/2003 | Mckay et al. | 123/198 F |
| 2005/0205045 A1* | 9/2005 | Michelini et al. | 123/198 F |

FOREIGN PATENT DOCUMENTS

JP    2004-278535    10/2004

* cited by examiner

*Primary Examiner*—Stephen K. Cronin
*Assistant Examiner*—J A Benton
(74) *Attorney, Agent, or Firm*—Donald J. Lewis; Allan J. Lippa

(57) ABSTRACT

A system and method for controlling randomly operable valves in an engine is presented. According to the method, valve lift is used to create a Helmholtz resonator from a deactivated cylinder. The method can reduce engine pressure based audible noise for variable displacement engines.

24 Claims, 5 Drawing Sheets

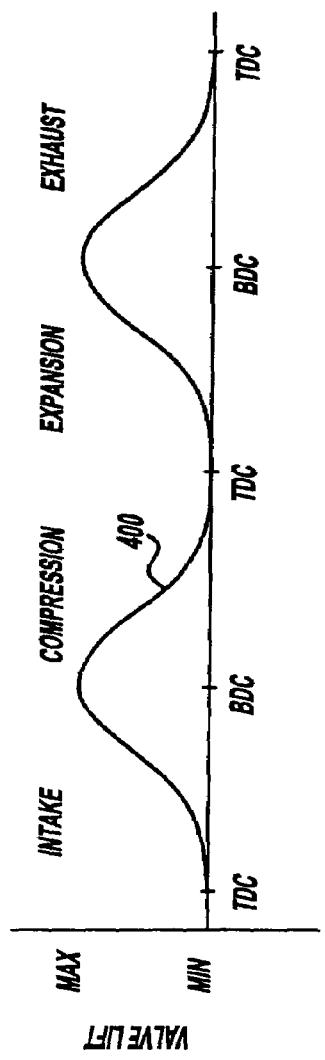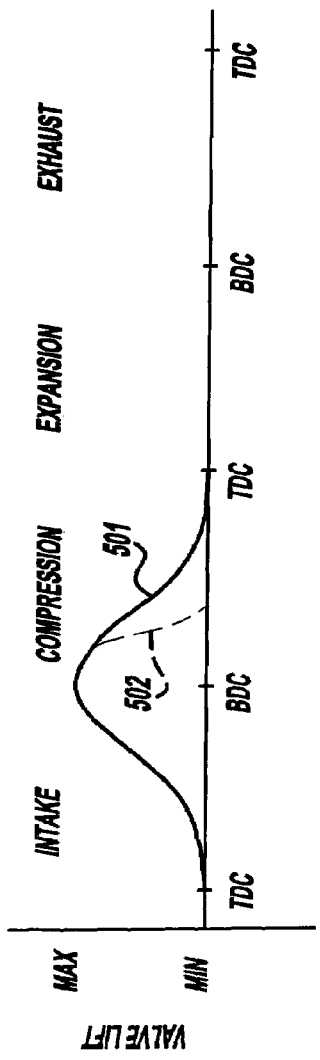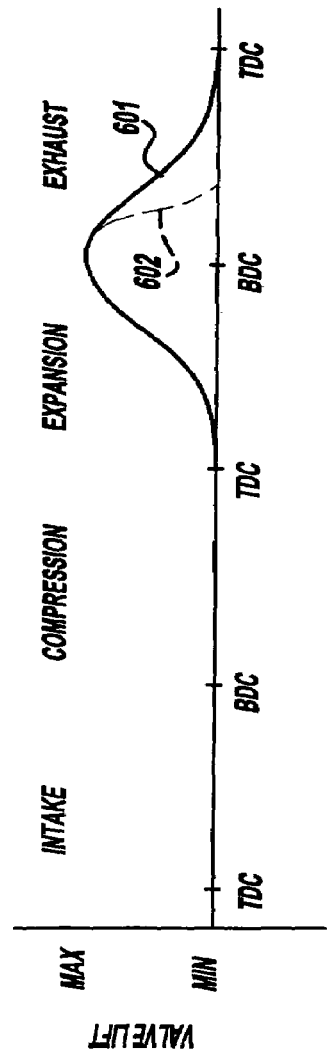

REDUCING ACOUSTIC NOISE OF AN ENGINE HAVING ELECTROMECHANICAL VALVES

FIELD

The present description relates to a method for controlling electrically actuated valves operating in a cylinder of an internal combustion engine.

BACKGROUND

One method to control intake and exhaust valve operation during engine operation is described in U.S. Pat. No. 6,405,693. This method presents a means to control electromagnetically actuated valves that may reduce exhaust noise. The approach attempts to reduce exhaust noise by staggering the opening timing of exhaust valves. This may reduce exhaust noise since cylinder pressure is restrained by initially releasing exhaust pressure through a single valve, thereby slowing the discharge of cylinder pressure into the exhaust manifold. The description also mentions that the method can be used to control intake valves by staggering the opening of two or more valves.

The above-mentioned method can also have several disadvantages. In particular, the approach requires two or more valves to regulate flow into or out of a cylinder. For engines with less than two intake and/or exhaust valves, the method may have reduced utility. For example, for a three valve, variable displacement engine (e.g., combusting an air-fuel mixture in four cylinders of an eight cylinder engine), having two intake valves and one exhaust valve, the method may not be effective for reducing exhaust manifold noise. Since the method relies on staggered opening of two valves to restrain flow into or out of the cylinder, the method may not be performed, in this example, to control exhaust gases since only one exhaust valve is present. Also for this example, operating the engine in a variable displacement mode can further increase engine exhaust noise that the method may not be capable of reducing since only a single exhaust valve is present.

In addition, depending on the engine operating region, multiple valves may not be necessary to improve engine breathing and power output. Therefore, adding an additional valve for the sole purpose of reducing engine noise may not make economic sense.

Furthermore, the above-mentioned method may increase engine pumping work in combusting cylinders of an engine if exhaust and/or intake valve timing is staggered. Pumping work can be increased by restraining flow into or out of a cylinder. Consequently, the fuel economy may decrease when valves are operated in this manner.

The inventors herein have recognized the above-mentioned disadvantages and have developed a method of electromechanical valve control that offers substantial improvements.

SUMMARY

One embodiment of the present description includes a method for controlling at least a randomly operable valve in a cylinder of an internal combustion engine during a cycle of the cylinder, said engine having a plurality of cylinders, the method comprising:

operating a randomly operable valve to substantially maintain a ratio between a valve lift amount and a cylinder volume, during at least a portion of a cycle of said cylinder.

By controlling a valve lift amount as the volume of a cylinder changes during engine rotation, a Helmholtz resonator may be constructed from a deactivated cylinder of an operating engine. The resonator may be used to reduce pressure based audible noise by controlling the movement of by at least a single valve.

Specifically, for multi-cylinder, engines that have randomly operable valves and that can be operated in a variable displacement mode, the valves of deactivated cylinders (cylinders that are not combusting an air-fuel mixture during a cycle of the engine) can be controlled so that intake and/or exhaust manifold audible noise is reduced. For example, a randomly operable valve and cylinder intake or exhaust port can form an orifice that is located along the length of an intake or exhaust manifold. This orifice combined with the cylinder volume can produce impedance at the resonator that can attenuate sound pressure wave energy that may otherwise propagate through an intake or exhaust manifold. Consequently, this method may reduce intake or exhaust pressure based noise by controlling a single intake or exhaust valve.

The present description may provide several advantages. Specifically, the approach may be capable of reducing audible pressure based engine noise by controlling a single valve. Consequently, engine noise may be reduced at a lower cost. In addition, the present method may reduce engine pumping work compared to other noise attenuation methods since flow restrictions into and out of combusting cylinders are reduced, at least during some conditions.

The above advantages and other advantages, and features of the present description will be readily apparent from the following detailed description of the preferred embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 4 is a plot that shows an example valve lift trajectory;

FIG. 5 is a plot that shows an alternate example of a valve lift trajectory;

FIG. 6 is a plot that shows an alternate example of a valve lift trajectory;

DETAILED DESCRIPTION

Figure 1:
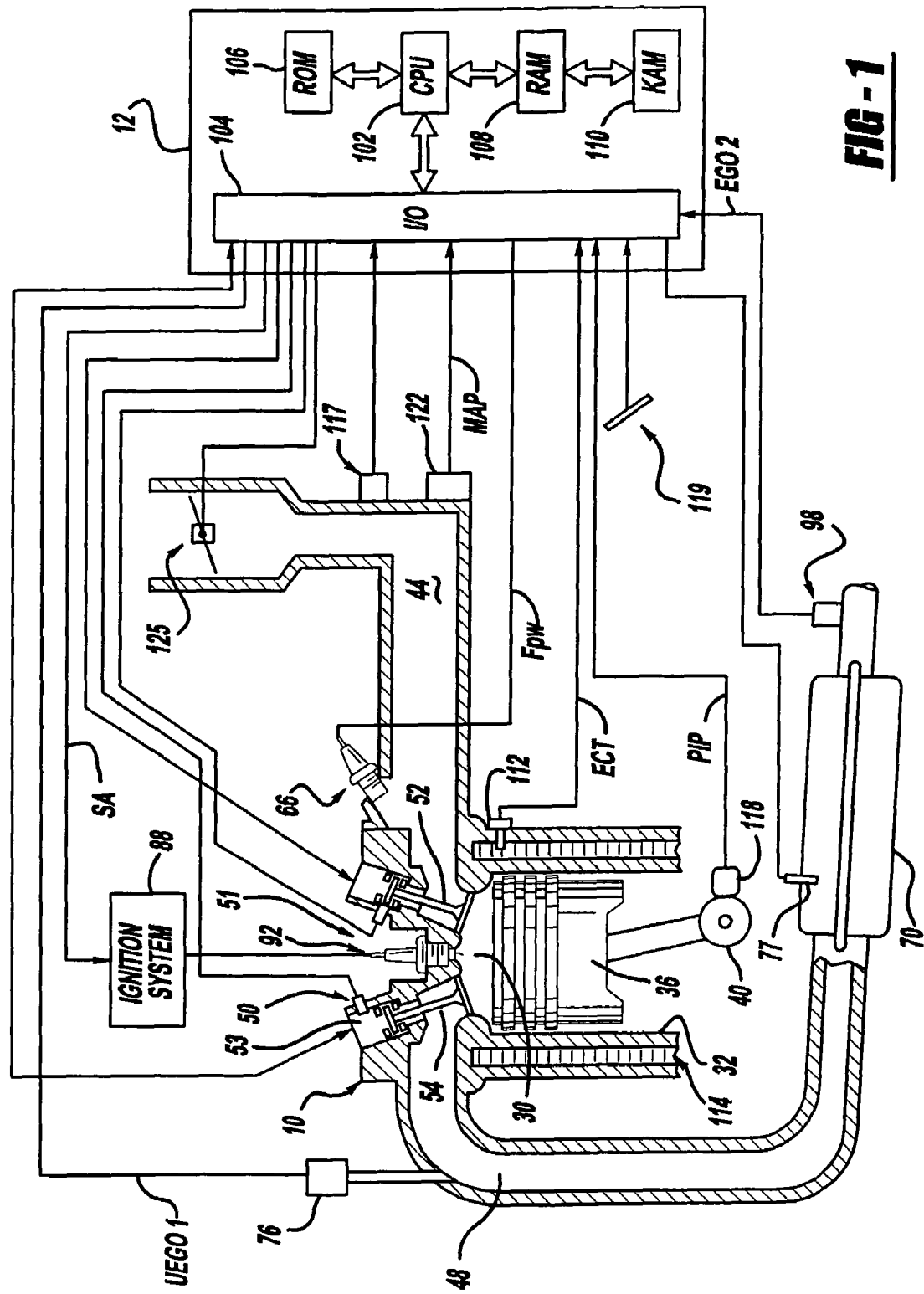
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electrically controlled valve coil and armature assembly 53. Alternatively, the valves may be controlled pneumatically, hydraulically, or by other known random actuation means. Armature temperature is determined by temperature sensor 51. Valve position is determined by position sensor 50. In an alternative example, each of valves actuators for valves 52 and 54 has a position sensor and a temperature sensor. In yet another example, valve position may be inferred, by armature current for example.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2:
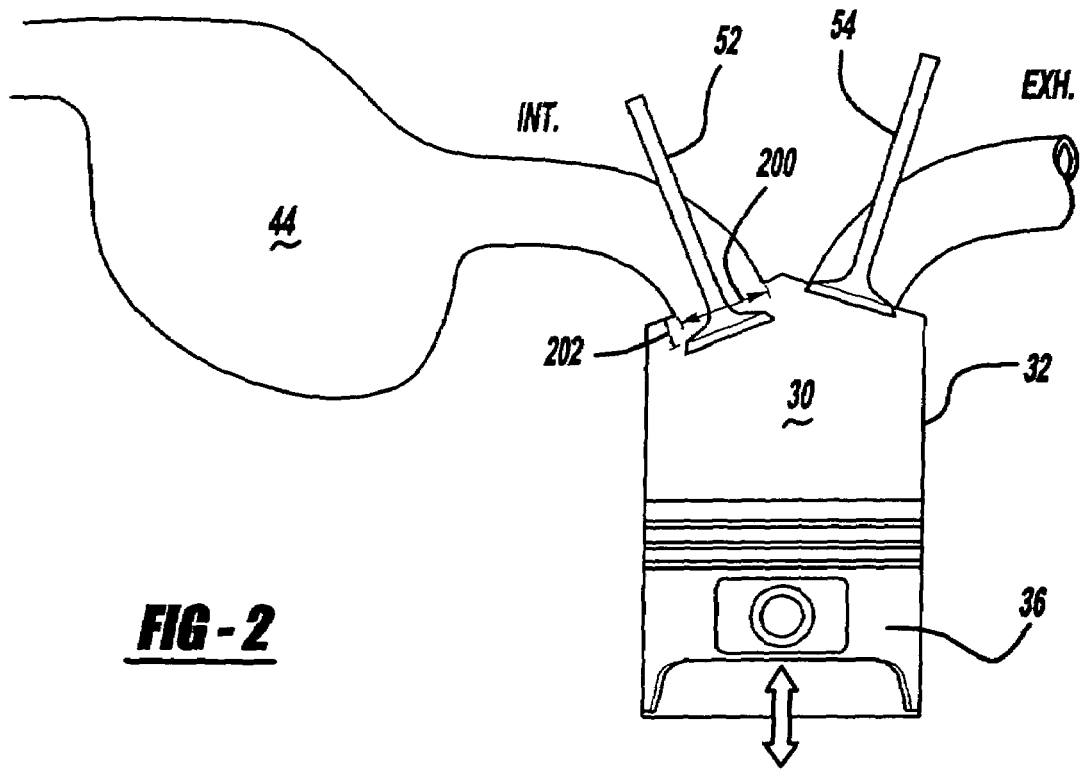
FIG. 2 is a schematic diagram that shows dimensional data and engine features used to produce a cylinder Helmholtz resonator.

Referring to FIG. 2, a schematic diagram that illustrates dimensional data and engine features used to produce a cylinder Helmholtz resonator. A single intake valve 52 and a single exhaust 54 valve are shown for simplicity and are not meant to limit the scope or breadth of this description. For example, some cylinder designs have additional intake and/or exhaust valves to improve efficiency and/or power. A Helmholtz resonator can be produced by operating a single intake or exhaust valve while holding the remaining valves in a closed position. Alternatively, two or more intake or exhaust valves may be used while the remaining valves are held closed. However, the attenuation frequency will be determined by the combined orifice areas created by the respective valves.

A sound pressure wave may be created in the intake manifold 44 by effectors that can include combustion pressure, piston movement, and opening and/or closing intake valves. Engines that are throttled upstream of the intake valves (e.g., they may be throttled upstream of an intake manifold by an electrical or mechanically actuated throttle valve), can attenuate pressure based engine noise via the intake throttle. This throttle can provide an increase in impedance to pressure and may act to reduce audible noise at the inlet of the intake system. However, the upstream throttle can also increase engine pumping losses, and thereby reduce fuel economy. Therefore, it can be beneficial to reduce upstream throttling, thereby increasing fuel economy, while limiting audible noise transmitted through the intake system. Randomly operable valves provide an opportunity to reduce engine throttling and to control pressure based engine noise since they are not constrained to timing or lift profiles of purely mechanically driven valves. By using randomly operable valves and a non-combusting cylinder, a Helmholtz resonator can be formed along the length of the air flow path, in the intake or exhaust manifold for example. Pressure energy that is produced by operating cylinders may be attenuated by the resonator before the pressure energy travels out of an engine intake system and into audible air space.

Randomly operable valves also allow for throttling at a cylinder and may reduce the need for upstream throttling and its related pumping losses. Further yet, randomly operable valves may be used to deactivate cylinders and reduce throttling upstream of the valves. However, engine noise that is do to pressure pulsations may be more noticeable when the intake manifold is less throttled and when fewer cylinders are operated. This may result from increased pressure in operating cylinders and from increased wave propagation out of the intake manifold.

Continuing with FIG. 2, the intake valve 52 is shown in an open position and the piston 36 is at a position that is partially through the stroke of the cylinder, an intake stroke for example. By adjusting the valve lift amount, based on or in unison with the piston position, a non-combusting cylinder can be used to construct a Helmholtz resonator that may be capable of attenuating a range of pressure energy, at least under some conditions. For example, a pressure wave traveling along the length of the manifold may encounter an orifice created by the intake valve 52. The valve seat diameter 200 and the valve lift amount 202 define an orifice area between the cylinder 30 volume and the intake manifold 44 volume that can be used to exchange pressure energy between the manifold and the cylinder (i.e., the two volumes). This exchange of pressure energy can reduce pressure energy in the intake manifold about a certain frequency range. In particular, the valve lift amount can be controlled to reduce combustion related frequencies and harmonics of those frequencies that account for some of the audible pressure energy. For example, for an eight cylinder engine operating in an even-firing four cylinder mode (a cylinder firing every 180° of crank angle rotation), rotating at a speed of 1450 RPM, it is desirable to cancel frequencies around 48.3 Hertz.

Figure 3:
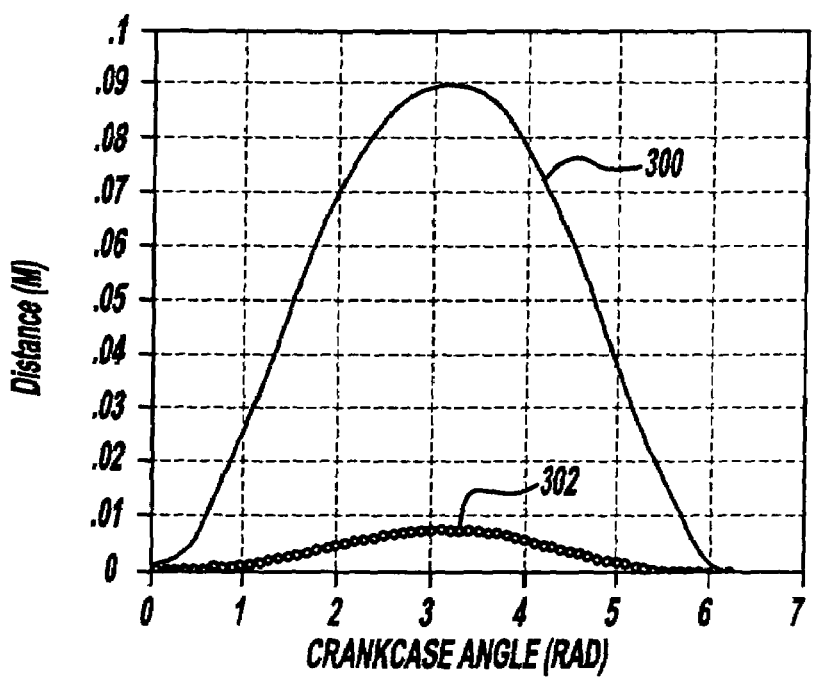
FIG. 3 is a plot that shows an example valve lift trajectory relative to crankshaft position.

Referring to FIG. 3, a plot of one example valve lift profile is shown. The randomly actuated valve position 302 follows a trajectory that is scaled to and/or correlated to piston position 300 over two piston strokes of a cylinder. Specifically, for a constant desired attenuation frequency (e.g., 48.3 Hz), the valve position follows a trajectory so that a constant, or nearly constant, ratio is attained between the valve lift amount and the cylinder volume over the cycle of the cylinder. For example, to attenuate frequencies around 48.3 Hz a ratio of 0.7261 m² (±0.1555 m²), where m is meters, should be provided to keep the frequency within ±5 Hz. In this way, a constant frequency range of pressure energy can be attenuated as the cylinder volume varies during the course of a cylinder cycle. The data of FIG. 3 were generated by a simulation parameterized for frequency attenuation in the range of 48.3 Hz. In addition, control can be provided so that frequency attenuation occurs over a limited portion of a cylinder cycle. For example, a valve can be opened when piston position is between top-dead-center (TDC) and bottom-dead-center (BDC), follow a scaled version of the cylinder piston trajectory, and then close the valve at BDC. This approach can be used to attenuate frequencies generated by selected cylinder events.

Referring to FIG. 4, a plot of an example valve lift profile of a cylinder with respect to the cycle of the cylinder is shown.

Valve position 400 may represent an exhaust or intake valve trajectory depending on whether noise attenuation is desired in the intake or exhaust manifold. Alternatively, an intake valve may follow valve trajectory 400 from TDC-intake to TDC-compression, while an exhaust valve follows the valve trajectory 400 from TDC-expansion to TDC-exhaust, or vise-versa. By alternating valve operation (i.e., alternating intake and exhaust valves) over four or more piston strokes, selected frequencies may be attenuated in respective intake and exhaust manifolds for selected portions of the four or more stroke interval.

Although possible, a cylinder and valve forming a Helmholtz resonator do not usually combust an air-fuel mixture when attenuation of pressure noise is desired. However, the figure depicts cylinder stroke phase (intake, exhaust, etc.) information so that valve lift can be referenced to an example four-cycle cylinder. In addition, piston top-dead-center (TDC) and bottom-dead-center (BDC) provide additional engine timing references. Notice that the Valve position trajectory 400 opens and closes the valve twice over the cylinder cycle. This allows the cylinder to attenuate frequencies over a greater interval of the crankshaft rotation. Specifically, frequencies are attenuated during the period where the intake valve is open.

In another example, the valve opening sequence illustrated in FIG. 4 can be conducted in two or more cylinders that are out of phase, with respect to the crankshaft position, so that pressure frequencies can be attenuated during the region of crankshaft rotation where the valve is closed in a companion deactivated cylinder. This allows pressure frequency attenuation over an even broader crankshaft interval.

In yet another example, the valve opening sequence illustrated in FIG. 4 can be conducted in one or more cylinders that are in phase, again with respect to the crankshaft position, so that an increase in pressure reduction magnitude occurs. This may be useful when higher noise pressure levels are present in the manifold, during reduced cylinder modes operating at higher cylinder loads for example.

Referring to FIG. 5, a plot of an alternate example valve lift profile with respect to the cycle of the cylinder is shown. As mentioned in the description of FIG. 4, cylinder stroke and piston position information are shown to provide reference engine position information. Also, as mentioned above, the valve lift profile may be an intake or exhaust valve, depending on whether noise attenuation is desired in the intake or exhaust manifold. Valve trajectory 501 follows essentially the same path as valve trajectory 400 in FIG. 4, but the second valve opening and closing sequence is eliminated. That is, the opening operating occurs during the first half of a four-stroke cylinder cycle. This valve profile reduces the interval of attenuation with respect to crankshaft position, but it may also provide a reduction in pumping work, compared to the method of FIG. 4 because all of the valves in the cylinder are closed during the second half of the cylinder cycle.

In another example, the valve trajectory of 501 may close the valve earlier so that a portion of gas can be trapped in a non-combusting cylinder. Oil consumption may be reduced in deactivated cylinders by maintaining an amount of air or exhaust gas in the cylinder so that vacuum in the cylinder is limited over the cylinder cycle. This alternate valve trajectory profile is shown in FIG. 5 where the valve trajectory 501 transitions from the solid line to the dotted line continuation 502. By closing the valve earlier, time available for pressure attenuation about the desired frequency may be reduced so that oil may be reduced in the combustion chamber.

Referring to FIG. 6, a plot of another alternate example valve lift profile with respect to the cycle of the cylinder is shown. As mentioned above and in the description of FIG. 4, cylinder stroke and piston position information are shown to provide reference engine position information. Also, as mentioned above, the valve lift profile may be an intake or exhaust valve, depending on whether noise attenuation is desired in the intake or exhaust manifold. Valve trajectory 601 follows essentially the same path as valve trajectory 400 in FIG. 4, but the first valve opening and closing sequence is eliminated. That is, the opening operating occurs during the second half of a four-stroke cylinder cycle. Again, reducing the valve open interval reduces the interval of attenuation with respect to crankshaft position, but it may also provide a reduction in pumping work, compared to the method of FIG. 4, because all of the valves in the cylinder are closed during the first half of the cylinder cycle.

Similar to the method mentioned in the description of FIG. 5, the valve trajectory 601 may close the valve earlier so that a portion of gas can be trapped in a non-combusting cylinder. This alternate valve trajectory profile is shown in FIG. 6 where the valve trajectory 601 transitions from the solid line to the dotted line continuation 602.

Figure 7:
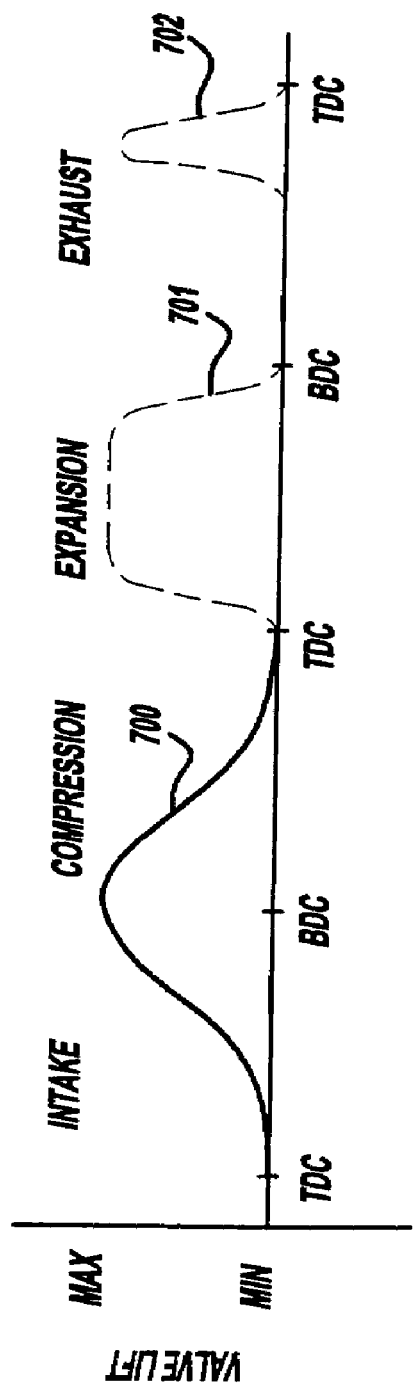
FIG. 7 is a plot that shows an alternate example of a valve lift trajectory.

Referring to FIG. 7, a plot of another alternate example valve lift profile with respect to the cycle of the cylinder is shown. As mentioned above, cylinder stroke and piston position information are shown to provide reference engine position information. Also, the valve trajectory may be assumed by an exhaust valve, an intake valve, or by alternating between intake and exhaust valves as mentioned in the description of FIG. 4. Valve trajectory 700 begins on a trajectory that is essentially the same as valve trajectory 400 shown in FIG. 4, but the second valve opening and closing sequence is altered. Specifically, the valve is opened during the portion of the cycle where the cylinder volume is expanding, and then the valve is closed before the volume completely contracts, thereby trapping a mass of air or exhaust in the cylinder. This portion of the cycle is identified by the dotted line 701, and occurs during the period identified as "Expansion". The cycle finishes with a short valve opening and closing event, denoted by the dotted line 702. By opening and closing the valve as the cylinder approaches the smallest cylinder volume (i.e., Top-Dead-Center (TDC))

the mass trapped from the 701 valve sequence can be exhausted. This sequence, identified by curves 700, 701, and 702, provides for pressure attenuation during valve sequence 700, mass collection for oil consumption reduction in valve sequence 701, and mass release in valve sequence 702 before the cycle is repeated. Consequently, noise pressure energy and oil consumption can be reduced by this sequence.

Figure 8:
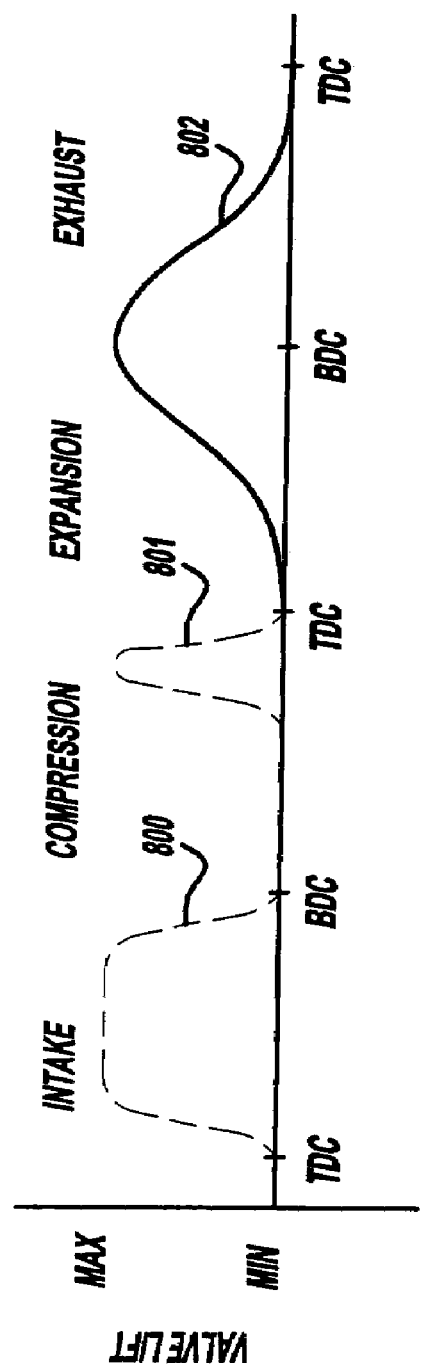
FIG. 8 is a plot that shows an alternate example of a valve lift trajectory.

Referring to FIG. 8, a plot of another alternate example valve lift profile with respect to the cycle of the cylinder is shown. This figure shows similar valve profiles to those mentioned in FIG. 7, except the valve sequence is reversed. Specifically, the mass collection occurs during the "Intake" period as compared to during the "Expansion" period shown in FIG. 7. In addition, the valve trajectory may be assumed by an exhaust valve, an intake valve, or by alternating between intake and exhaust valves as mentioned in the description of FIG. 4. As mentioned above, a deactivated cylinder is not combusting an air-fuel mixture so valve operation with respect to piston position can be altered without affecting cylinder combustion.

The valve sequences illustrated in FIGS. 4–8 may be altered to attenuate different desired frequencies or they may be phase shifted without deviating from the scope or breadth of this description. Furthermore, the valve sequences of FIGS. 4–8 may take place simultaneously in two or more cylinders.

Figure 9:
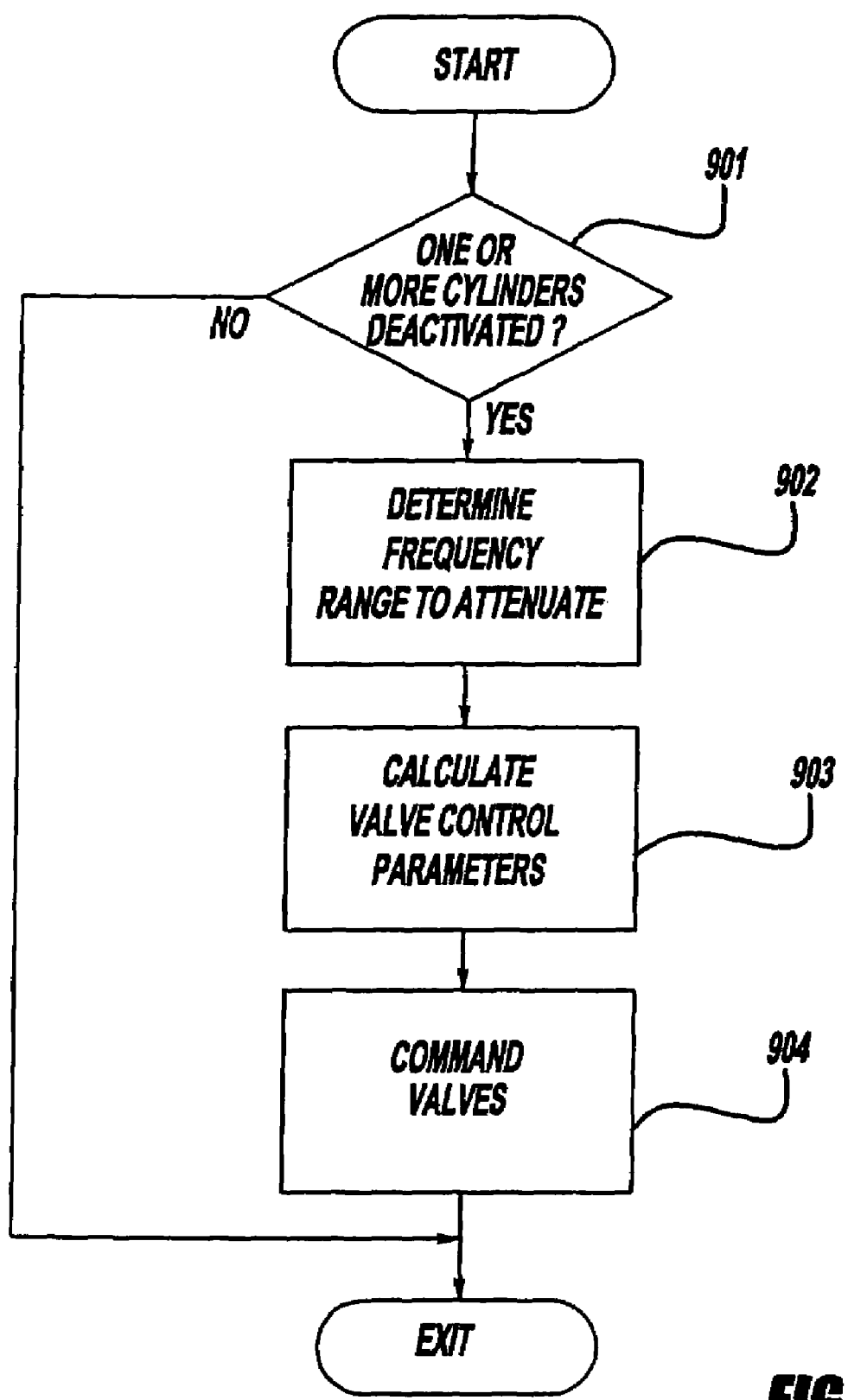
FIG. 9 is a flow diagram showing an example strategy to attenuate pressure based engine noise.

Referring to FIG. 9, a flow chart of a valve control strategy is shown. In step 901, the routine determines if the engine is operating in a reduced cylinder mode (e.g., 4 cylinder mode in an 8 cylinder engine). If not, the routine exits. If so, the routine proceeds to step 902.

In step 902, the desired frequency to attenuate is determined. In one example, the following equation is used to determine the attenuation frequency:

$$f = N \cdot \text{combrev} \cdot \text{ncylop}$$

Where f is the desired attenuation frequency having units of hertz, N is the engine speed having units of revolutions per minute, combrev is the number of combustion events each engine revolution, and ncylop is the number of combusting cylinders. Of course, other equations or variations of this equation may also be used to determine attenuation frequency. The routine proceeds to step 903.

In step 903, a valve control parameters are determined. As described above, the empty cylinder volume and the valve lift form a device for attenuating pressure energy in a connected manifold. This structure follows the form of a Helmholtz resonator connected to a larger bounded space via an orifice. The frequency of resonance of a Helmholtz resonator can be described by the following equation:

$$f = \frac{c}{2\pi} * \sqrt{\frac{A_0}{V_R * (l_0 + 2\delta_R)}}$$

Where $V_R$ is the volume of the resonator, $A_O$ is the area the an orifice that connects the two volumes (i.e., the resonator volume and the bounded space containing sound wave energy), c is the speed of sound, $l_O$ is the length of the volume connecting orifice, and $\delta_R$ is a correction factor for the orifice length and is described by the equation:

$$\delta_R = \frac{8r_0}{3\pi}$$

Where $r_O$ is the orifice radius. Further, if the orifice is a circular pipe, the orifice area can be described from the orifice radius by the following equation:

$$A_O = \pi r_O^2$$

The mechanics and geometry of an engine manifold, cylinder, and valvetrain are different than that of the basic Helmholtz structure (i.e., a bounded space volume and a resonator volume connected by an orifice). Therefore, the physics describing the engine are derived to conform to the basic Helmholtz describing equation.

In particular, the resonator volume of a cylinder and valve based Helmholtz resonator is variable. That is, as the engine rotates the piston moves back and forth in the cylinder, thereby varying the cylinder or resonator volume. The distance between the piston and the cylinder head can be described by:

$$s(\theta) = r * \left\{(1 - \cos(\theta)) + \frac{r}{4l} * (1 - \cos(2\theta))\right\}$$

Where s is the distance between the piston and the cylinder head, described as a function of crankshaft angle θ, r is ½ the stroke distance, and l is the connecting rod length. The resonator volume $V_R$ can be determined from the piston displacement using the following equation:

$$V_R = \left\{\frac{\pi b^2}{4}\right\} * s(\theta) + V_0$$

Where $V_O$ is the cylinder volume when the piston is at TDC and where b is the cylinder bore length.

The orifice area connecting the two volumes, namely the region defined by the valve lift and valve seat diameter, is variable and can be parameterized by the following equation:

$$A_O(\theta) \approx u_l(\theta) * 2\pi * u$$

Where $A_o$ is the orifice area, $u_l$ is the valve lift amount, and where u is the distance across the valve seat. FIG. 2 illustrates the valve lift dimension 202 ($u_l$) and the valve seat diameter 200 (u) for reference.

The orifice radius can be determined from the orifice area and is described by the equation:

$$r_0(\theta) \cong \sqrt{\frac{A_0(\theta)}{\pi}}$$

The before mentioned Helmholtz equation is modified to account for the possibility of the orifice having a location offset from the center of a cylinder and to correct for air density which may vary during engine operation. The modified Helmholtz equation is described by:

$$f = \frac{c}{2\pi} * \left\{ \sqrt{\frac{A_0}{V_R * (l_0 + 2\delta_R)}} \right\} * C$$

Where C is a parameter that can be described by an empirically determined orifice correction factor that is multiplied by a density correction factor. The density factor can account for temperature and pressure variations and is determined by indexing a table of predetermined factors that account for air density variation if the properties of air deviate from standard conditions.

The orifice area (i.e., the area formed by the valve lift amount and the valve seat diameter) can be computed over one revolution or two strokes of a cylinder by determining the desired lift amount for a given piston position. By adjusting the valve lift amount based on or in synchronism with piston position, a resonator that attenuates frequencies about a single frequency may be created. The ratio between valve lift and cylinder volume does not need to be exact, but it should be in the region where attenuation is desired, or substantially maintained in that region. Furthermore, by adjusting the valve lift, attenuation frequencies can be changed to match engine operating conditions. By making the appropriate substitutions from the above equations, the orifice area is calculated for a constant frequency and results in the following solution:

$$A_0(\theta) = \left\{ \frac{f * 2\pi}{c * C} \right\}^2 * V_R(\theta) * (l_0 + 2\delta_R)$$

$$= \left\{ \frac{f * 2\pi}{c * C} \right\}^2 * \left( \frac{\pi b^2}{4} * s(\theta) + V_0 \right) * \left\{ l_0 + \frac{16}{3\pi} * \sqrt{\frac{A_0(\theta)}{\pi}} \right\}$$

Further, by substituting $$\Psi(\theta) = \sqrt{A_0(\theta)}$$

in the above equation, the following solvable quadratic equation is formed:

$$\Psi^2(\theta) - \left\{ \frac{f * 2\pi}{c * C} \right\}^2 * \left( \frac{\pi b^2}{4} * s(\theta) + V_0 \right) * \frac{16}{3\pi^{3/2}} * \Psi(\theta) -$$

$$\left\{ \frac{f * 2\pi}{c * C} \right\}^2 * \left( \frac{\pi b^2}{4} * s(\theta) + V_0 \right) * l_0 = 0$$

Solving for $\Psi$ yields:

$$\Psi(\theta) = \left[ \left\{ \frac{f * 2\pi}{c * C} \right\}^2 * \left( \frac{\pi b^2}{4} * s(\theta) + V_0 \right) * \frac{16}{3\pi^{3/2}} \right] +$$

$$\frac{1}{2} * \sqrt{ \left\{ \frac{f * 2\pi}{c * C} \right\}^4 * \left( \frac{\pi b^2}{4} * s(\theta) + V_0 \right)^2 * \left( \frac{16^2}{9\pi^3} \right) + 4 * \left\{ \frac{f * 2\pi}{c * C} \right\}^2 * \left( \frac{\pi b^2}{4} * s(\theta) + V_0 \right) * l_0 }$$

This equation allows valve lift, $u_l(\theta)$, to be calculated in terms of orifice area from $\Psi(\theta)$.

The desired attenuation frequency, from step 902, is substituted into the $\Psi(\theta)$ equation, along with the other listed parameters, and the desired valve lift is determined. The desired valve lift amount can then be used to determine valve commands.

In one example, current for electrically actuated valves can be determined. The valve actuator armature can be commanded to a position by a position controller of the form:

Coil_cur($k$)=ftn__ff(basis_offset)+$K_1$($e_{pos}(k)$)+$K_2 \Sigma e_{pos}(k)$

Where Coil$_{13}$ cur(k) is the commanded coil current, ftn_ff is a feed forward table look-up that provides armature coil current as a function of armature position (basis_offset), $K_1$ is a constant that is based on sample time and a predetermined current gain, alternatively $K_1$ can vary as a function of other variables (e.g., engine temperature, armature location, magnitude of the error signal, etc.), $e_{pos}(k)$ is the armature position error at sample k, $K_2$ is a constant that is based on sample time and a predetermined current gain, alternatively $K_2$ can vary as a function of other variables (e.g., engine temperature, armature location, magnitude of the error signal, etc.), and $\Sigma e_{pos}(k)$ is the sum of armature position error at a given commanded position.

In this example, when the armature is commanded to a new position, the desired position is updated which creates an error between the actual armature position and the desired armature position. The position error causes a decrease in the coil current and allows the armature to move away from the pole face and to the desired position.

Armature position may be determined in a variety of ways, none of which are intended to limit the scope or breadth of this description. For example, armature position may be determined by linear variable displacement transducers, binary position sensors, coil current, or potentiometer devices. Furthermore, actuator coil current may also be determined in a variety of ways, none of which are intended to limit the scope of breadth of this description. For example, actuator current may be determined from a current coil through which actuator current travels, secondary resistive networks, or by current monitoring transistors.

In yet other examples, valve lift commands may be issued in terms of oil pressure, air pressure, or by combinations and sub-combinations of electrical, mechanical, hydraulic, and/or pneumatic operated actuators. The method of attaining variable valve lift is not meant to limit the scope or breadth of this description. The routine continues on to step 904.

In step 904, the valve commands are issued. As mentioned above, in one example, valve position can be controlled via current supplied to a valve actuator. This current can be supplied by a valve controller that may be an integral to controller 12 or that may be of separate construction. The valve commands are issued and corrected at discrete positions as the engine rotates. The routine then proceeds to exit.

As will be appreciated by one of ordinary skill in the art, the routines described in FIG. 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

I claim:

1. A method for controlling at least a randomly operable valve in a cylinder of an internal combustion engine during a cycle of the cylinder, said engine having a plurality of cylinders, the method comprising:
   operating a randomly operable valve to substantially maintain a ratio between a valve lift amount and a cylinder volume, during at least a portion of a cycle of said cylinder.

2. The method of claim 1 wherein the volume of said cylinder changes during the cycle of said cylinder.

3. The method of claim 1 wherein said randomly operated valve is an exhaust valve.

4. The method of claim 1 wherein said randomly operated valve is an intake valve.

5. The method of claim 1 wherein said cycle of said cylinder is comprised of an even number of strokes of said cylinder.

6. The method of claim 5 wherein said even number of strokes is two strokes.

7. The method of claim 1 wherein said ratio varies with engine speed.

8. The method of claim 1 wherein said valve lift amount is further adjusted based on the density of air in a manifold of said engine.

9. The method of claim 8 wherein said manifold is an intake manifold.

10. The method of claim 8 wherein said manifold is an exhaust manifold.

11. A method for controlling at least a randomly operable valve in a cylinder of an internal combustion engine during a cycle of the cylinder, said engine having a plurality of cylinders, the method comprising:
    deactivating fuel to said cylinder of said engine;
    adjusting a valve lift amount of an valve to produce a substantially constant ratio between said valve lift amount and the volume of said cylinder, at least after said deactivating of said fuel, during at least a portion of a cycle of said cylinder.

12. The method of claim 11 wherein said randomly operated valve is an exhaust valve.

13. The method of claim 11 wherein said randomly operated valve is an intake valve.

14. The method of claim 11 wherein said ratio varies with engine speed.

15. The method of claim 11 wherein said valve lift amount is further adjusted based on the density of air in a manifold of said engine.

16. The method of claim 15 wherein said manifold is an intake manifold.

17. The method of claim 15 wherein said manifold is an exhaust manifold.

18. A method for controlling at least a randomly operable valve in a cylinder of an internal combustion engine during a cycle of the cylinder, said engine having a plurality of cylinders, the method comprising:
    deactivating fuel to said cylinder of said engine; and
    adjusting a valve lift amount of a valve to produce a substantially constant ratio between said valve lift amount and the volume of said cylinder, at least after said deactivating of said fuel, during at least a portion of a cycle of said cylinder; and
    varying said ratio with the number of cylinders combusting an air-fuel mixture during a cycle of said engine.

19. The method of claim 18 wherein said randomly operable valve is an exhaust valve.

20. The method of claim 18 wherein said randomly operable valve is an intake valve.

21. The method of claim 18 wherein the valve lift amount is further adjusted based on engine speed.

22. The method of claim 18 wherein said valve lift amount is further adjusted based on the number of cylinders combusting an air-fuel mixture during a cycle of said engine.

23. A method for controlling at least a randomly operable valve in a cylinder of an internal combustion engine during a cycle of the cylinder, said engine having a plurality of cylinders, the method comprising:
    deactivating fuel to said cylinder of said engine; and
    moving said randomly operable valve to substantially follow a scaled trajectory of a piston located in said cylinder, for at least a portion of a cycle of said engine.

24. A computer readable storage medium having stored data representing instructions executable by a computer to control a randomly operable valve in a cylinder of an internal combustion engine of a vehicle, said storage medium comprising:
    instructions for operating a randomly operable valve to control a ratio between a valve lift amount and a cylinder volume, during at least a portion of a cycle of said cylinder.

* * * * *